(12) United States Patent
Frantz et al.

(10) Patent No.: US 10,977,246 B2
(45) Date of Patent: Apr. 13, 2021

(54) GENERATING A DATABASE QUERY USING A DIMENSIONAL HIERARCHY WITHIN A GRAPHICAL USER INTERFACE

(71) Applicant: SIGMA COMPUTING, INC., San Francisco, CA (US)

(72) Inventors: Jason D. Frantz, San Francisco, CA (US); Max H. Seiden, San Francisco, CA (US); Kenneth Truong, Temple City, CA (US); Robert C. Woollen, San Rafael, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 251 days.

(21) Appl. No.: 16/130,072

(22) Filed: Sep. 13, 2018

(65) Prior Publication Data
US 2020/0089794 A1 Mar. 19, 2020

(51) Int. Cl.
*G06F 16/242* (2019.01)
*G06F 16/22* (2019.01)
*G06F 16/25* (2019.01)

(52) U.S. Cl.
CPC ........ *G06F 16/2423* (2019.01); *G06F 16/221* (2019.01); *G06F 16/2428* (2019.01); *G06F 16/25* (2019.01)

(58) Field of Classification Search
None
See application file for complete search history.

(56) References Cited

U.S. PATENT DOCUMENTS

| | | | | |
|---|---|---|---|---|
| 9,378,231 | B2* | 6/2016 | Yang | G06F 16/221 |
| 9,542,442 | B2* | 1/2017 | Meiyyappan | G06F 16/134 |
| 10,140,352 | B2* | 11/2018 | Hariharan | G06F 16/907 |
| 2006/0195424 | A1* | 8/2006 | Wiest | G06Q 10/10 |
| 2009/0157711 | A1* | 6/2009 | Baer | G06F 16/252 |
| 2015/0006470 | A1* | 1/2015 | Mohan | G06F 16/283 |
| | | | | 707/603 |
| 2015/0066930 | A1* | 3/2015 | Tibrewal | G06F 3/0485 |
| | | | | 707/737 |

(Continued)

OTHER PUBLICATIONS

Keith Fink, Overview of PivotTables and PivotCharts in Microsoft Access 2002, Microsoft Support WebCast, XP0022772525, URL: https://support.microsoft.com/default.aspx?scid=/servicedesk/webcasts/wc0- 81601/wvblurb081601.asp (Year: 2001).*

(Continued)

*Primary Examiner* — Jean M Corrielus (57) ABSTRACT

Generating a database query using a dimensional hierarchy within a graphical user interface including displaying a data set within a spreadsheet structure, wherein the data set comprises a plurality of columns; displaying a list structure comprising a first level and a second level; receiving a selection of a first column of the plurality of columns as a first key for the first level in the list structure; receiving a selection of a second column of the plurality of columns as a second key for the second level in the list structure; and in response to receiving the selection of the first column and receiving the selection of the second column and based on an order of the first key and the second key in the list structure, generating the database query defining a hierarchical relationship between the first column and the second column.

20 Claims, 7 Drawing Sheets

(56) References Cited

U.S. PATENT DOCUMENTS

| | | | | |
|---|---|---|---|---|
| 2015/0169650 | A1* | 6/2015 | Gajic | G06F 16/285 707/609 |
| 2015/0242446 | A1* | 8/2015 | Stolte | G06F 16/248 707/807 |
| 2015/0261728 | A1* | 9/2015 | Davis | G06F 16/9558 715/234 |
| 2015/0261729 | A1* | 9/2015 | Davis | G06F 40/111 715/234 |
| 2016/0217401 | A1* | 7/2016 | Leung | G06Q 10/06311 |
| 2017/0052766 | A1* | 2/2017 | Garipov | G06F 16/2291 |
| 2017/0177678 | A1* | 6/2017 | Stolte | G06F 16/2282 |
| 2019/0065565 | A1* | 2/2019 | Stolte | G06F 3/04842 |
| 2019/0121804 | A1* | 4/2019 | Stolte | G06F 3/0482 |
| 2020/0082008 | A1* | 3/2020 | Wong | G06F 16/282 |

OTHER PUBLICATIONS

Sal Hasi, Drag Drop Grouping Flex DataGrid, YouTube, URL: https://www.youtube.com/watch?v=soWMKzt19VM (Year: 2015).*

Wikipedia, Pivot Table, URL: https://en.wikipedia.org/w/index.php?title=Pivot_table&oldid=857163289 (Year: 2018).*

Wikipedia, SQL window function, URL: https://en.wikipedia.org/w/index.php?title=SQL_window_function&oldid=8445-20607 (Year: 2018).*

International Search Report and Written Opinion, PCT/US2019/050999, Feb. 5, 2020, 9 pages.

Sigma Computing, "Sigma Computing—Product Tour," YouTube, URL: https://www.youtube.com/watch?v=nkcprbRiztY, whole document, dated Jun. 14, 2018, retrieved Feb. 5, 2020, 1 page.

* cited by examiner

GENERATING A DATABASE QUERY USING A DIMENSIONAL HIERARCHY WITHIN A GRAPHICAL USER INTERFACE

BACKGROUND

Field of the Invention

The field of the invention is data processing, or, more specifically, methods, apparatus, and products for generating a database query using a dimensional hierarchy within a graphical user interface.

Description of Related Art

Modern businesses may store large amounts of data in remote databases within cloud-based data warehouses. This data may be accessed using database query languages, such as structured query language (SQL). However, different presentations and configurations of the data may require constructing complex queries, which may be difficult for most users.

SUMMARY

Methods, systems, and apparatus for generating a database query using a dimensional hierarchy within a graphical user interface are disclosed in this specification. Generating a database query using a dimensional hierarchy within a graphical user interface includes displaying a data set within a spreadsheet structure, wherein the data set comprises a plurality of columns; displaying a list structure comprising a first level and a second level; receiving a selection of a first column of the plurality of columns as a first key for the first level in the list structure; receiving a selection of a second column of the plurality of columns as a second key for the second level in the list structure; and in response to receiving the selection of the first column and receiving the selection of the second column and based on an order of the first key and the second key in the list structure, generating the database query defining a hierarchical relationship between the first column and the second column.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
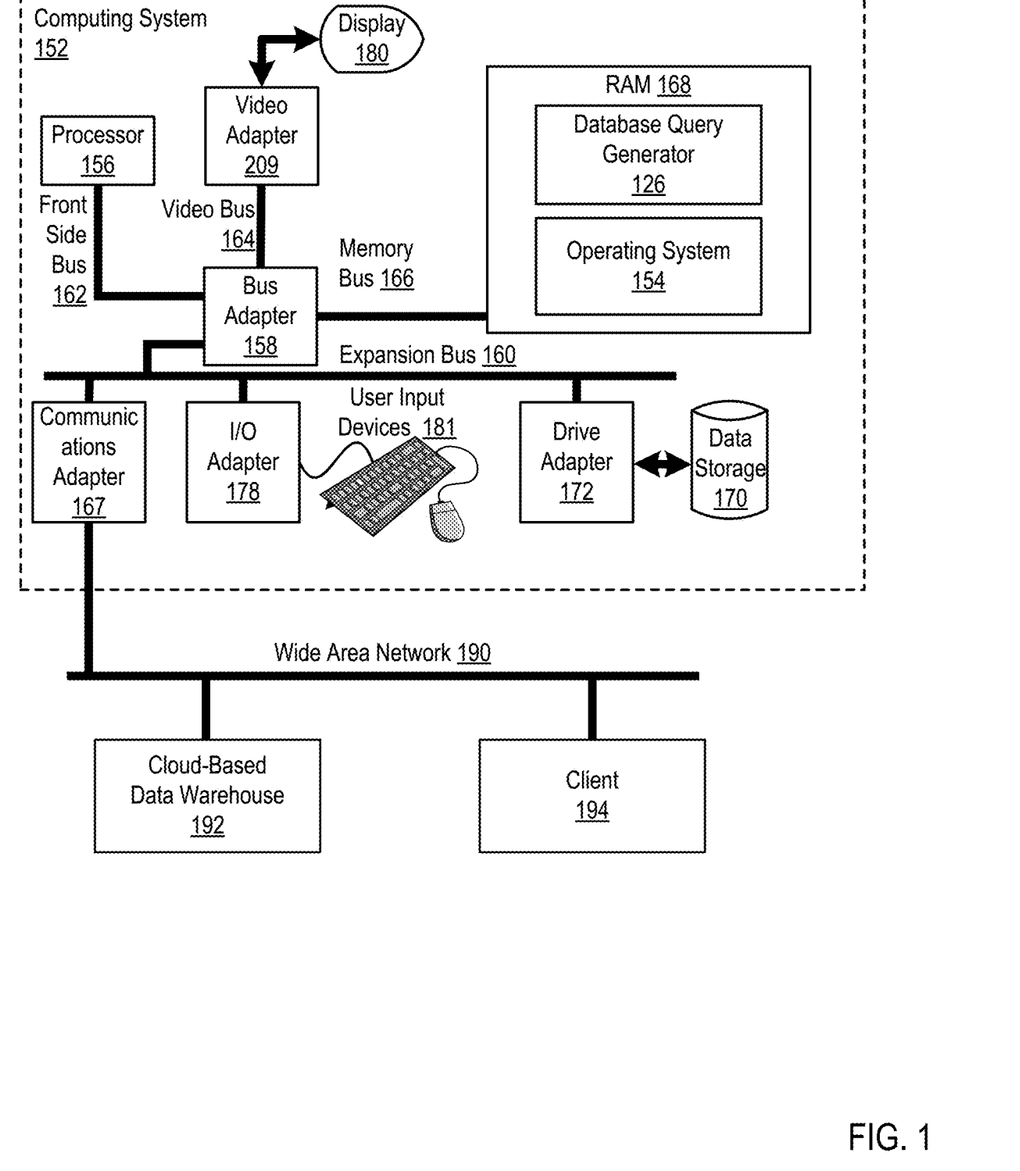
FIG. 1 sets forth a block diagram of an example system configured for generating a database query using a dimensional hierarchy within a graphical user interface according to embodiments of the present invention.

Exemplary methods, apparatus, and products for generating a database query using a dimensional hierarchy within a graphical user interface in accordance with the present invention are described with reference to the accompanying drawings, beginning with FIG. 1. FIG. 1 sets forth a block diagram of automated computing machinery comprising an exemplary computing system (152) configured for generating a database query using a dimensional hierarchy within a graphical user interface according to embodiments of the present invention. The computing system (152) of FIG. 1 includes at least one computer processor (156) or 'CPU' as well as random access memory (168) ('RAM') which is connected through a high speed memory bus (166) and bus adapter (158) to processor (156) and to other components of the computing system (152).

Stored in RAM (168) is an operating system (154). Operating systems useful in computers configured for generating a database query using a dimensional hierarchy within a graphical user interface according to embodiments of the present invention include UNIX™ Linux™, Microsoft Windows™, AIX™, IBM's i OS™, and others as will occur to those of skill in the art. The operating system (154) in the example of FIG. 1 is shown in RAM (168), but many components of such software typically are stored in non-volatile memory also, such as, for example, on data storage (170), such as a disk drive. Also stored in RAM is the database query generator (126), a module for generating a database query using a dimensional hierarchy within a graphical user interface according to embodiments of the present invention.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of data storage (170). Disk drive adapters useful in computers configured for generating a database query using a dimensional hierarchy within a graphical user interface according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for generating a database query using a dimensional hierarchy within a graphical user interface according to embodiments of the present invention include modems for wired dial-up communications, Ethernet (IEEE 802.3) adapters for wired data communications, and 802.11 adapters for wireless data communications.

The communications adapter (167) is communicatively coupled to a wide area network (190) that also includes a cloud-based data warehouse (192) and a client system (194). The cloud-based data warehouse (192) is a computing system or group of computing systems that hosts a database for access over the wide area network (190). The client system (194) is a computing system that accesses the database using the database query generator (126) on the computing system (152).

Figure 2:
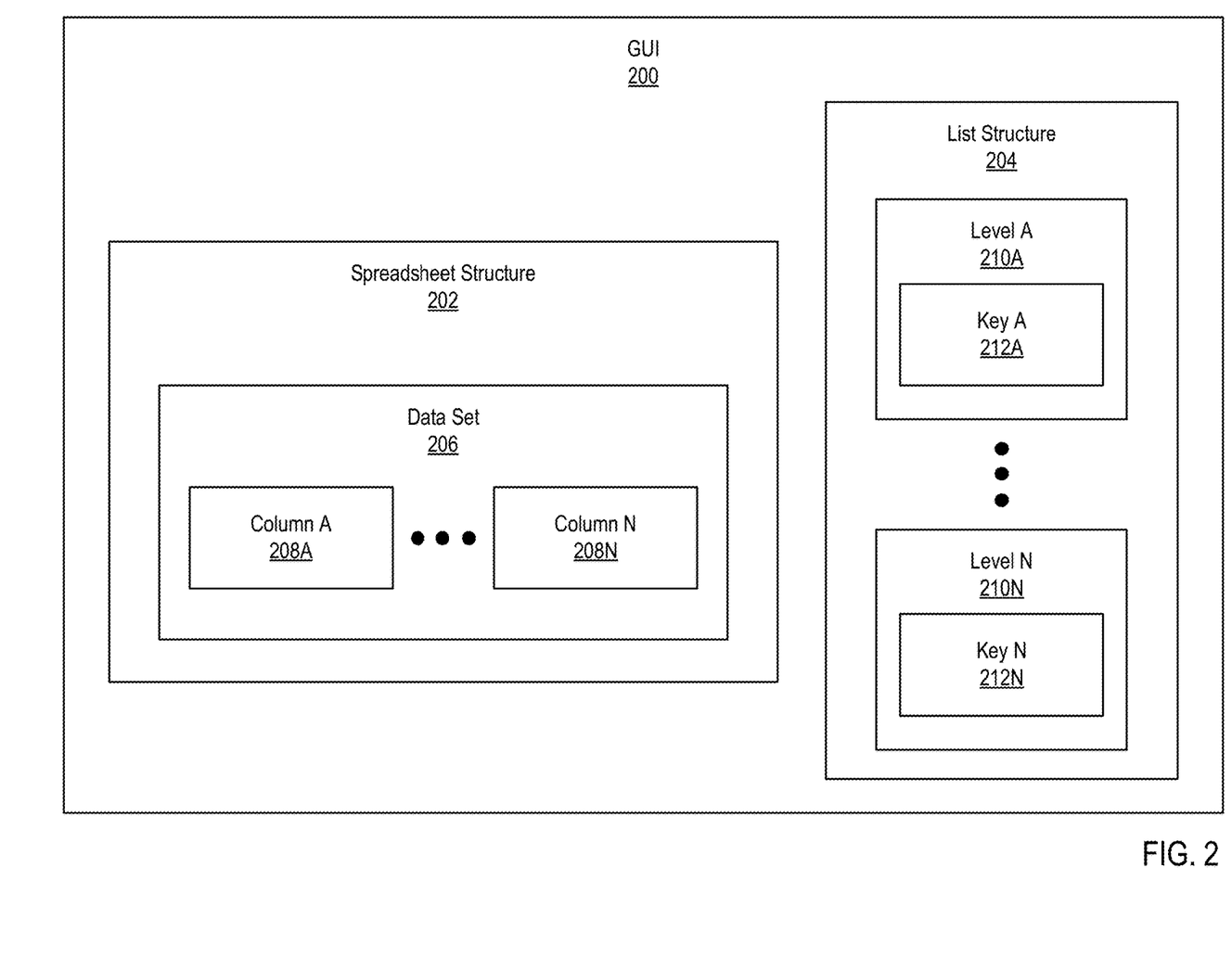
FIG. 2 sets forth a block diagram of an example system configured for generating a database query using a dimensional hierarchy within a graphical user interface according to embodiments of the present invention.

FIG. 2 shows an exemplary graphical user interface (GUI) for generating a database query using a dimensional hierarchy according to embodiments of the present invention. As shown in FIG. 2, the exemplary GUI (200) includes a spreadsheet structure (202) and a list structure (204). The spreadsheet structure (202) includes a data set (206) with multiple columns (column A (208A), column N (208N)). The list structure (204) includes multiple levels (level A (210A), level N (210N)). Each level may include zero, one, or more than one key (key A (212A), key N (212N)).

The GUI (200) is a user interface that presents graphical elements to a user and receives user input from the user. The GUI (200) may be presented by a database query generator and displayed on a client system (e.g., on a system display or mobile touchscreen). The GUI (200) may be an Internet application hosted on a server system communicatively coupled to both the client system and a cloud-based data warehouse.

The spreadsheet structure (202) is a graphical element and organizing mechanism for the data set (206). The spreadsheet structure (202) displays the data within the data set (206) as rows of data organized by columns (column A (208A), column N (208N)). The columns (column A (208A), column N (208N)) delineate different categories of the data in each row of the data set (206). The columns (column A (208A), column N (208N)) may also be calculations using other columns (column A (208A), column N (208N)) in the data set (206).

The data set (206) is a collection of data from a cloud-based data warehouse presented in the spreadsheet structure (202). The data set (206) may be a result of a database query sent by the database query generator to a database in the cloud-based data warehouse. The data set (206) may be received by the database query generator and configured for presentation in the spreadsheet structure (202).

The list structure (204) is a graphical element used to define and organize the hierarchical relationships between the columns (column A (208A), column N (208N)) of the data set (206). The term "hierarchical relationship" refers to subordinate and superior groupings of columns (column A (208A), column N (208N)). For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure (204) presents a dimensional hierarchy to the user. Specifically, the list structure (204) presents levels arranged hierarchically across at least one dimension. Each level (level A (210A), level N (210N)) within the list structure (204) is a position within a hierarchical relationship between columns (column A (208A), column N (208N)) selected as keys (key A (212A), key N (212N)). The keys (key A (212A), key N (212N)) identify the one or more columns (column A (208A), column N (208N)) that are the participants in the hierarchical relationship. Each level (level A (210A), level N (210N)) may have more than one key.

One of the levels (level A (210A), level N (210N)) in the list structure (204) may be a base level. Columns selected for the base level provide data at the finest granularity. One of the levels (level A (210A), level N (210N)) in the list structure (204) may be a totals or root level. Columns selected for the totals level provide data at the highest granular level.

The GUI (200) may be managed by a database query generator. The database query generator is hardware, software, or an aggregation of hardware and software configured to determine the selection of columns as keys in the list structure (204) and generate a database query based on the order of the keys.

The GUI (200) may enable a user to drag and drop columns (column A (208A), column N (208N)) into the list structure (204). The order of the list structure (204) may specify the hierarchy of the columns (column A (208A), column N (208N)) relative to one another. A user may be able to drag and drop the columns (column A (208A), column N (208N)) in the list structure at any time to redefine the hierarchical relationship between columns. The hierarchical relationship defined using the columns (column A (208A), column N (208N)) selected as keys (key A (212A), key N (212N)) in the list structure (204) may be utilized in charts such that drilling down (e.g., double click on a bar), enables a new chart to be generated based on a level lower in the hierarchy.

Figure 3:
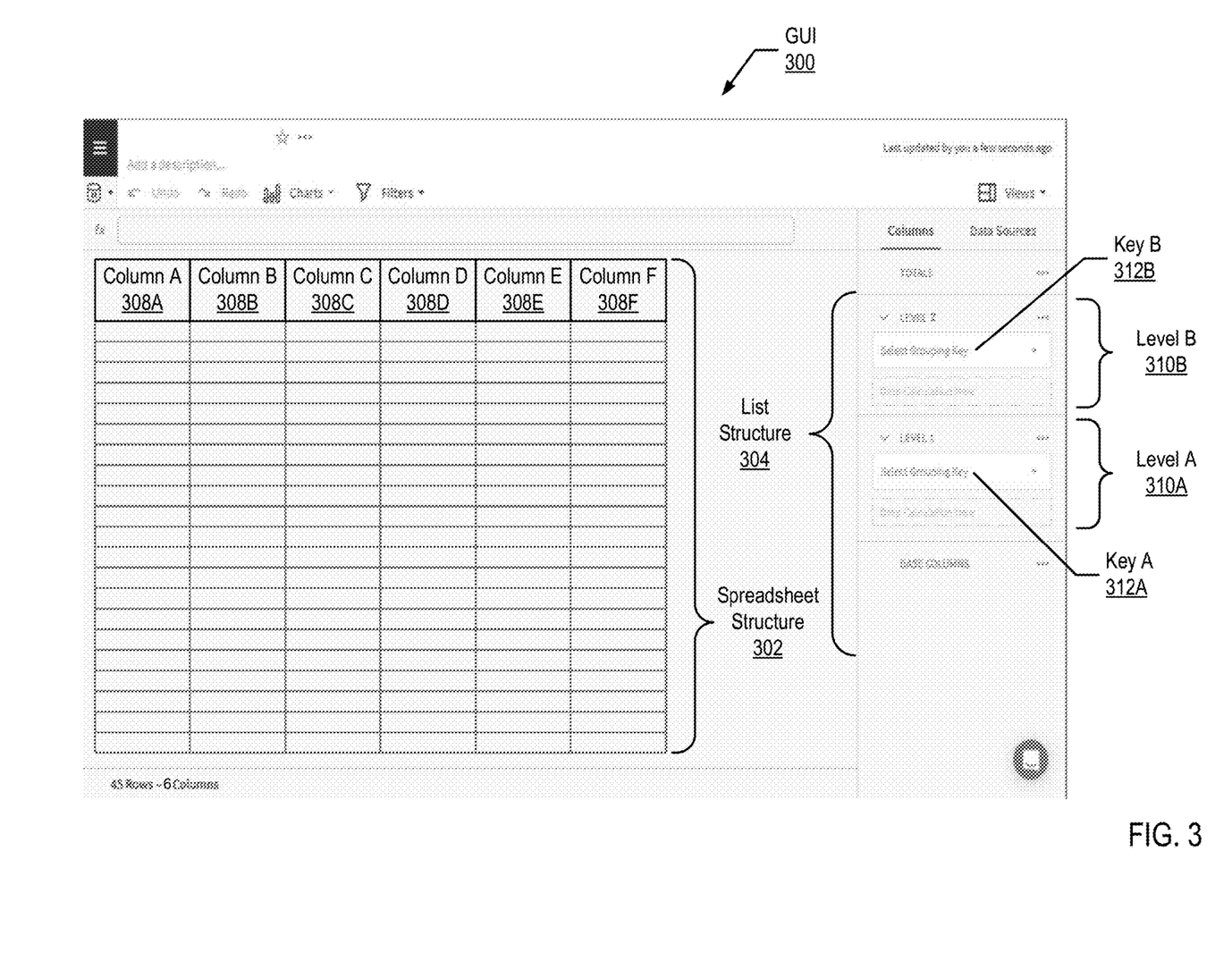
FIG. 3 sets forth a block diagram of an example system configured for generating a database query using a dimensional hierarchy within a graphical user interface according to embodiments of the present invention.

FIG. 3 shows an exemplary implementation of a GUI for generating a database query using a dimensional hierarchy according to embodiments of the present invention. As shown in FIG. 3, the exemplary implementation of the GUI (300) includes a spreadsheet structure (302) and a list structure (304). The spreadsheet structure (302) includes a data set (shown as empty rows) with six columns (column A (308A), column B (308B), column C (308C), column D (308D), column E (308E), column F (308F)). The list structure (304) includes two levels (level A (310A), level B (310B)). Level A (310A) includes key A (312A), and level B (310B) includes key B (312B)).

Figure 4:
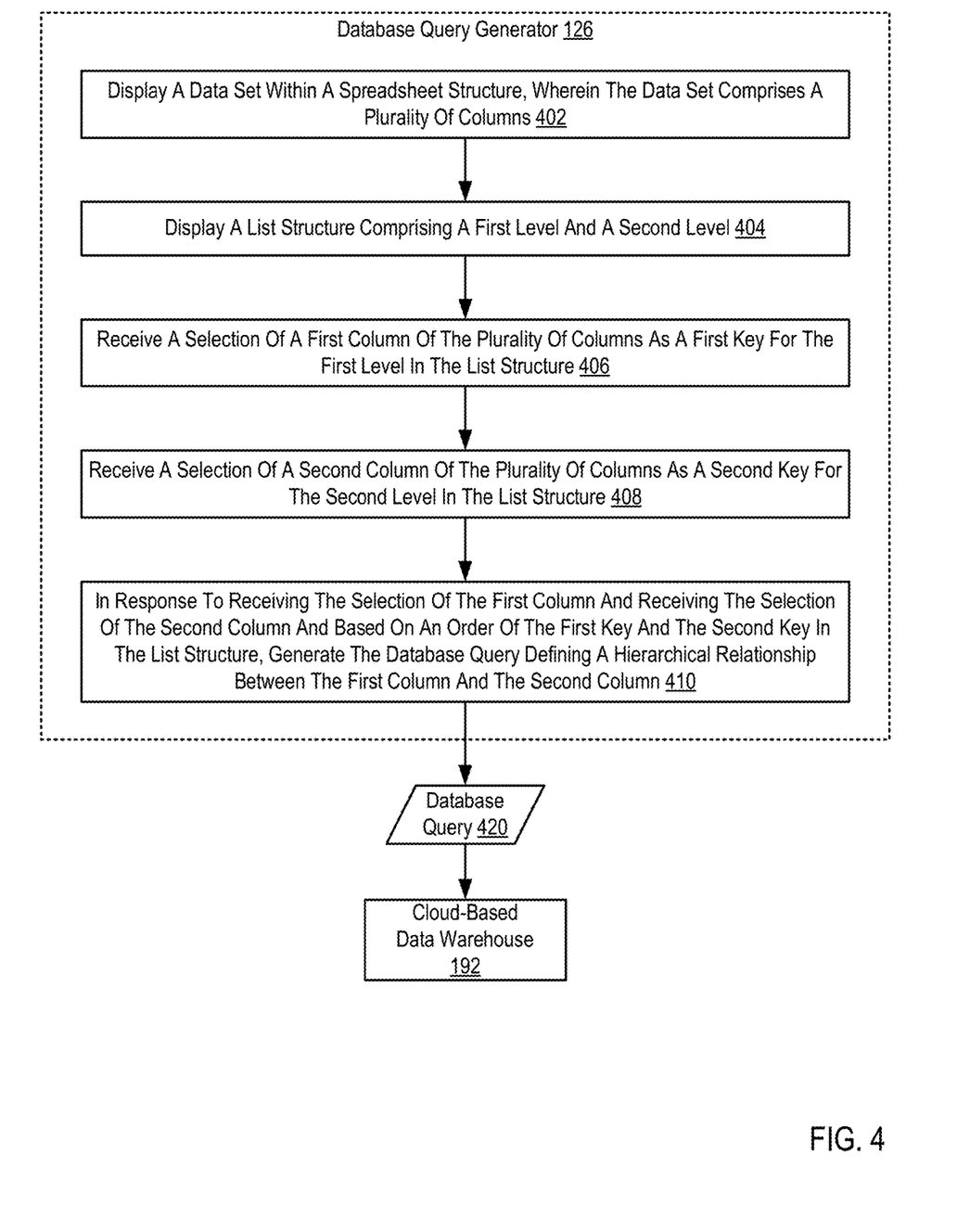
FIG. 4 sets forth a flow chart illustrating an exemplary method for generating a database query using a dimensional hierarchy within a graphical user interface according to embodiments of the present invention.

For further explanation, FIG. 4 sets forth a flow chart illustrating an exemplary method for generating a database query using a dimensional hierarchy within a graphical user interface according to embodiments of the present invention that includes displaying (402) a data set within a spreadsheet structure, wherein the data set comprises a plurality of columns. Displaying (402) a data set within a spreadsheet structure, wherein the data set comprises a plurality of columns may be carried out by the database query generator (126) presenting data in the form of rows in the spreadsheet structure. The data set may be the result of a previous database query to a database in a cloud-based data warehouse (192). For example, the cloud-based data warehouse (192) may include a database of hotels. As shown in the example data set of Table 1, the data set may include the addresses and number of rooms for hotels in downtown Austin, Houston, and Dallas.

TABLE 1

| City | Street Name | Street Number | Hotel Name | Number of Rooms |
|---|---|---|---|---|
| Houston | Texas Ave. | 1100 | Magnolia | 54 |
| Austin | San Jacinto St. | 700 | Omni | 65 |
| Houston | Texas Ave. | 700 | Lancaster | 62 |
| Dallas | Pacific Ave. | 1600 | Hilton | 68 |
| Austin | Brazos St. | 604 | Driskill | 58 |
| Austin | San Jacinto St. | 200 | Hampton Inn | 49 |
| Dallas | Commerce St. | 1401 | Magnolia | 35 |
| Houston | Crawford St. | 710 | Hampton Inn | 72 |
| Dallas | Main St. | 1201 | Westin | 51 |
| Dallas | Commerce St. | 1700 | Hampton Inn | 60 |
| Houston | Texas Ave. | 1520 | Westin | 44 |
| Austin | Brazos St. | 605 | Firehouse Hostel | 18 |

The method of FIG. 4 further includes displaying (404) a list structure comprising a first level and a second level. Displaying (404) a list structure comprising a first level and a second level may be carried out by the database query generator (126) presenting a graphical indication of a location within the GUI of a list structure. The list structure may include graphical indications of the first level and the second level within the list structure. The graphical indications may include labeled boxes indicating an area within the list structure for the first level and the second level.

The method of FIG. 4 further includes receiving (406) a selection of a first column of the plurality of columns as a first key for the first level in the list structure. Receiving (406) a selection of a first column of the plurality of columns as a first key for the first level in the list structure may be carried out by the database query generator (126) detecting that the first column has been selected by the user as the first key for the first level in the list structure. The first column may be selected in a variety of ways. For example, a column from the spreadsheet structure may be clicked and dragged to the first level within the list structure. As another example, the column may be clicked on, and a menu may be presented allowing the user to confirm the selection of the first column as the first key for the first level of the list structure.

The first column selected as the first key for the first level in the list structure may be a calculation using a least one other column of the plurality of columns. Specifically, the first column may be created to perform a calculation using data from another column as input. The first column may then be selected as the first key for the first level in the list structure.

The method of FIG. 4 further includes receiving (408) a selection of a second column of the plurality of columns as a second key for the second level in the list structure. Receiving (408) a selection of a second column of the plurality of columns as a second key for the second level in the list structure may be carried out by the database query generator (126) detecting that the second column has been selected by a user as the second key for the second level in the list structure. The second column may be selected in a variety of ways. For example, a column from the spreadsheet structure may be clicked and dragged to the second level within the list structure. As another example, the column may be clicked on, and a menu may be presented allowing the user to confirm the selection of the second column as the second key for the second level of the list structure.

The second column selected as the second key for the second level in the list structure may be a calculation using a least one other column of the plurality of columns. Specifically, the second column may be created to perform a calculation using data from another column as input. The second column may then be selected as the second key for the second level in the list structure.

The method of FIG. 4 further includes in response to receiving the selection of the first column and receiving the selection of the second column and based on an order of the first key and the second key in the list structure, generating (410) the database query (420) defining a hierarchical relationship between the first column and the second column. Determining that the database query generator (126) has received the selection of the first column and the selection of the second column may be carried out by the database query generator (126) detecting that the user has selected the first column as the first key for the first level and selected the second column as the second key for the second level in the list structure.

Generating (410) the database query (420) defining a hierarchical relationship between the first column and the second column may be carried out by the database query generator (126) determining the order of the first key and the second key in the list structure. The order may be determined by the level for which each column has been selected as a key. The column selected as a key for the top level may be determined to be the highest column in the hierarchical relationship. The column selected as a key for the bottom level may be determined to be the lowest column in the hierarchical relationship.

Generating (410) the database query (420) defining a hierarchical relationship between the first column and the second column may further be carried out by using the order of the first key and the second key in the list structure to select a database query statement and populate the statement with parameters based on the first column and the second column, and the order of the first column and the second column in the list structure. The database query may be auto-populated in response to various selections by the user, including the selection of the first column and the second column. Other user selections may include filters and column sorting. Once the database query is generated, the database query generator (126) may send the database query over a wide area network to the cloud-based data warehouse (192).

The database query defining the hierarchical relationship between the first column and the second column may include a structure query language (SQL) group by statement. The group by statement or statements may be auto-populated with references to the first column and the second column. Multiple group by statements may be nested within one another and be populated with references to the first column and the second column based on the order of the first column and the second column.

A block of database statements may be generated for each user selection made. After each selection is made, the blocks of database statements may be combined to generate the database query. For example, the selection of the first column may result in the generation of a first block of database statements, the selection of the second column may result in the generation of a second block of database statements, and a selected filter may result in the generation of a third block of database statements. After the last selection is made, the three blocks of database statements may be combined into a single database query.

Generating (410) the database query (420) defining a hierarchical relationship between the first column and the second column may further be carried out based on a sorting instruction received from a user. The sorting instruction is an instruction that changes the order in which the rows in a column are presented within each level. The sorted order may then be used in a calculation column. For example, a calculation column using a "lag" function may use the sorted order of one column and offset each row in the column up or down a set number of rows.

A level key may provide the sorting instruction as a default sorting order. For example, if the level key is a column of names, the sorting instruction may generate a sorting order that is alphabetical. As another example, if the level key is a column of consecutive numbers, the sorting instruction may generate a sorting order that is lowest to highest.

The above limitations improve the operation of the computer system by generating complex database queries based on user-friendly selections of data categories. The above limitations describe a specific, structured graphical user interface paired with a prescribed functionality directly related to the graphical user interface's structure that is addressed to and resolves a specifically identified problem in the prior state of the art. Specifically, the order of the selected columns is used to generate a database query that may be too complex or difficult for most users to write themselves.

Figure 5:
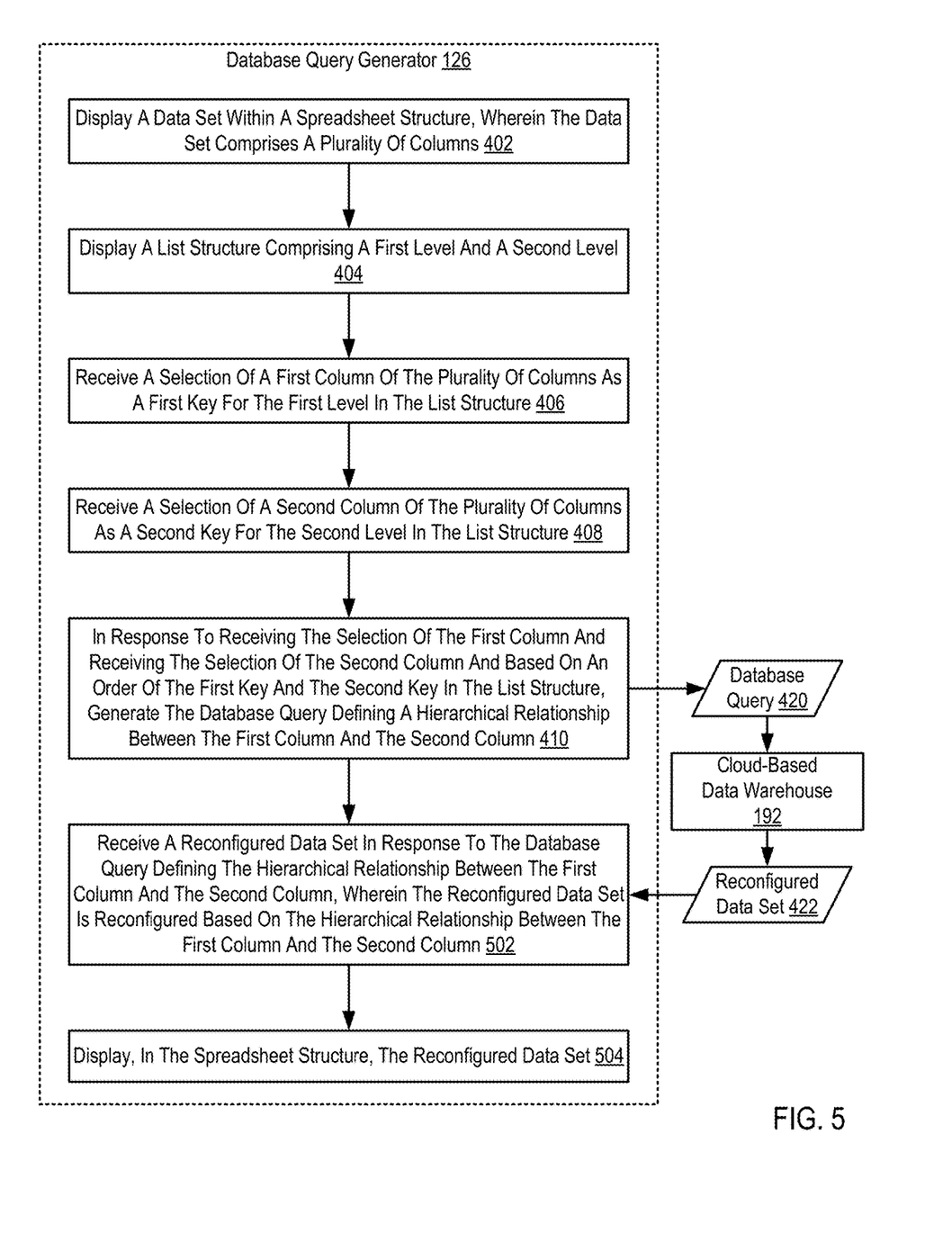
FIG. 5 sets forth a flow chart illustrating an exemplary method for generating a database query using a dimensional hierarchy within a graphical user interface according to embodiments of the present invention.

For further explanation, FIG. 5 sets forth a flow chart illustrating a further exemplary method for generating a database query using a dimensional hierarchy within a graphical user interface according to embodiments of the present invention that includes displaying (402) a data set within a spreadsheet structure, wherein the data set comprises a plurality of columns; displaying (404) a list structure comprising a first level and a second level; receiving (406) a selection of a first column of the plurality of columns as a first key for the first level in the list structure; receiving (408) a selection of a second column of the plurality of columns as a second key for the second level in the list structure; and in response to receiving the selection of the first column and receiving the selection of the second column and based on an order of the first key and the second key in the list structure, generating (410) the database query (420) defining a hierarchical relationship between the first column and the second column.

The method of FIG. 5 differs from the method of FIG. 4, however, in that the method of FIG. 5 further includes receiving (502) a reconfigured data set (422) in response to the database query (420) defining the hierarchical relationship between the first column and the second column, wherein the reconfigured data set (422) is reconfigured based on the hierarchical relationship between the first column and the second column; and displaying (504), in the spreadsheet structure, the reconfigured data set (422).

Receiving (502) a reconfigured data set (422) in response to the database query (420) defining the hierarchical relationship between the first column and the second column, wherein the reconfigured data set (422) is reconfigured based on the hierarchical relationship between the first column and the second column may be carried out by database query generator (126) receiving the reconfigured data set (422) from the cloud-based data warehouse (192) in response to the database query (420).

Displaying (504), in the spreadsheet structure, the reconfigured data set (422) may be carried out by the database query generator (126) replacing the data set in the spreadsheet structure with the reconfigured data set (422) received from the cloud-based data warehouse (192). The reconfigured data set (422) may include the same or similar data as the existing data set, but be reorganized based on the user selections.

Continuing with the example of Table 1, assume that the city column is dragged and dropped into the first (top) level of the list structure as the first key. Assume further, that the street name column is dragged and dropped into the second (bottom) level of the list structure as the second key. A database query is then generated that groups the data rows first by street name, then by city. The database query is sent to the cloud-based data warehouse, and in response, the database query generator (126) receives a reconfigured data set as shown in Table 2.

TABLE 2

| City | Street Name | Street Number | Hotel Name | Number of Rooms |
|---|---|---|---|---|
| Austin | Brazos St. | 604 | Driskill | 58 |
| | | 605 | Firehouse Hostel | 18 |
| | San Jacinto St. | 700 | Omni | 65 |
| | | 200 | Hampton Inn | 49 |
| Dallas | Commerce St. | 1401 | Magnolia | 35 |
| | | 1700 | Hampton Inn | 60 |
| | Main St. | 1201 | Westin | 51 |
| | Pacific Ave. | 1600 | Hilton | 68 |
| Houston | Crawford St. | 710 | Hampton Inn | 72 |
| | Texas Ave. | 1520 | Westin | 44 |
| | | 1100 | Magnolia | 54 |
| | | 700 | Lancaster | 62 |

Figure 6:
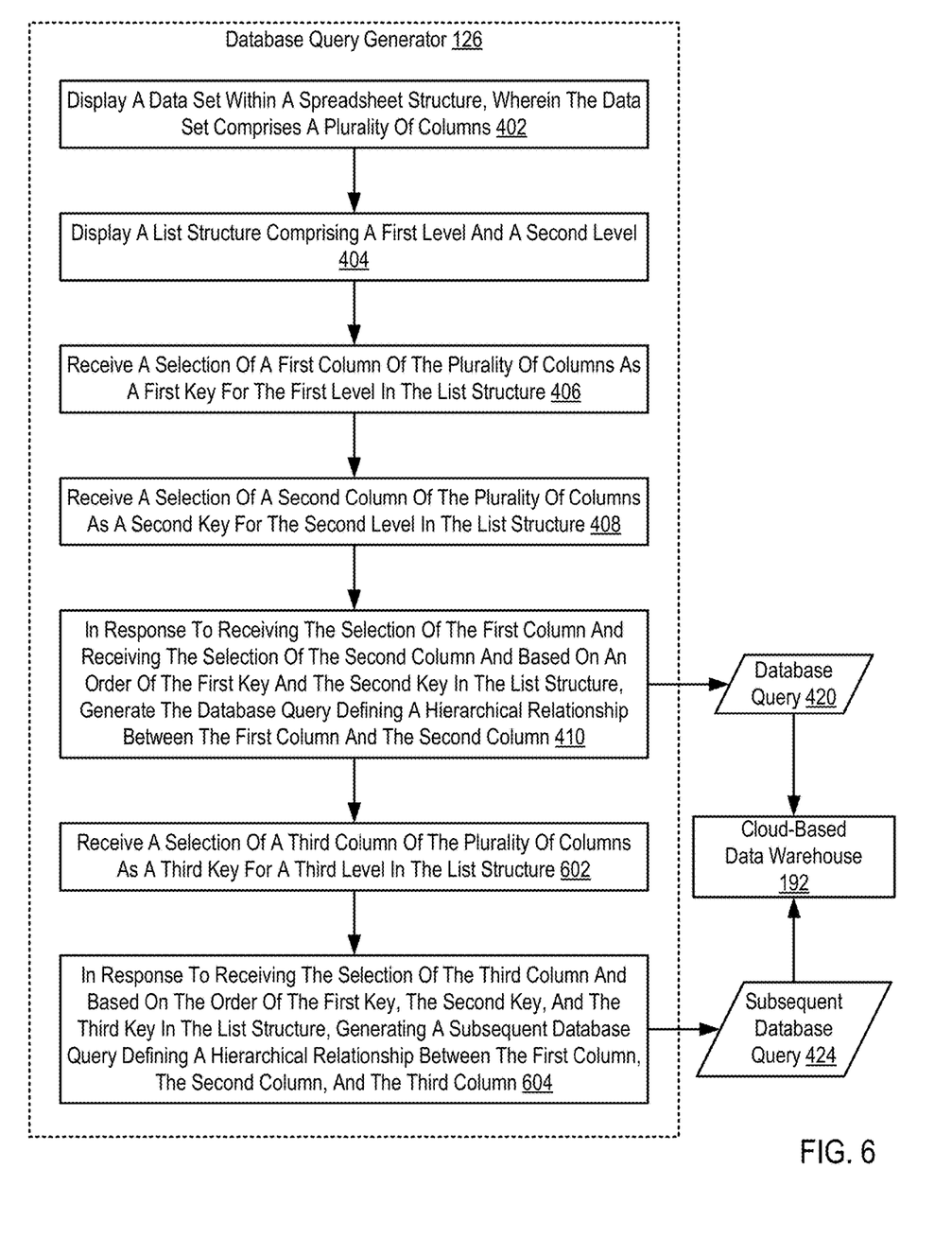
FIG. 6 sets forth a flow chart illustrating an exemplary method for generating a database query using a dimensional hierarchy within a graphical user interface according to embodiments of the present invention.

For further explanation, FIG. 6 sets forth a flow chart illustrating a further exemplary method for generating a database query using a dimensional hierarchy within a graphical user interface according to embodiments of the present invention that includes displaying (402) a data set within a spreadsheet structure, wherein the data set comprises a plurality of columns; displaying (404) a list structure comprising a first level and a second level; receiving (406) a selection of a first column of the plurality of columns as a first key for the first level in the list structure; receiving (408) a selection of a second column of the plurality of columns as a second key for the second level in the list structure; and in response to receiving the selection of the first column and receiving the selection of the second column and based on an order of the first key and the second key in the list structure, generating (410) the database query (420) defining a hierarchical relationship between the first column and the second column.

The method of FIG. 6 differs from the method of FIG. 4, however, in that the method of FIG. 6 further includes receiving (602) a selection of a third column of the plurality of columns as a third key for a third level in the list structure; and in response to receiving the selection of the third column and based on the order of the first key, the second key, and the third key in the list structure, generating (604) a subsequent database query (424) defining a hierarchical relationship between the first column, the second column, and the third column.

Receiving (602) a selection of a third column of the plurality of columns as a third key for a third level in the list structure may be carried out by the database query generator (126) detecting that the third column has been selected by the user as the third key for the third level in the list structure. The third column may be selected in a variety of ways. For example, a column from the spreadsheet structure may be clicked and dragged to the third level within the list structure. As another example, the column may be clicked on, and a menu may be presented allowing the user to confirm the selection of the third column as the third key for the third level of the list structure.

The third column selected as the third key for the third level in the list structure may be a calculation using a least one other column of the plurality of columns. Specifically, the third column may be created to perform a calculation using data from another column as input. The third column may then be selected as the third key for the third level in the list structure.

Generating (604) a subsequent database query (424) defining a hierarchical relationship between the first column, the second column, and the third column may be carried out by the database query generator (126) detecting that the user has selected the first column as the first key for the first level, selected the second column as the second key for the second level, and selected the third column as the third key for the third level in the list structure.

Generating (604) a subsequent database query (424) defining a hierarchical relationship between the first column, the second column, and the third column may be carried out by the database query generator (126) determining the order of the first key, the second key, and the third key in the list structure. The order may be determined by the level for which each column has been selected as a key. The column selected as a key for the top level may be determined to be the highest column in the hierarchical relationship. The column selected as a key for the middle level may be determined to be the middle column of the hierarchical relationship. The column selected as a key for the bottom level may be determined to be the lowest column in the hierarchical relationship.

Generating (604) the subsequent database query (424) defining a hierarchical relationship between the first column and the second column may further be carried out by using the order of the first key, the second key, and the third key in the list structure to select a database query statement and populate the statement with parameters based on the first column, second column, and third column, and the order of the first column, second column, and third column in the list structure. The database query may be auto-populated in response to various selections by the user, including the selection of the first column, second column, and third column.

Once the subsequent database query is generated, the database query generator (126) may send the subsequent database query over a wide area network to the cloud-based data warehouse (192). In response, the database query generator (126) may receive a subsequently reconfigured data set and present the subsequently reconfigured data set in the spreadsheet structure of the GUI.

Figure 7:
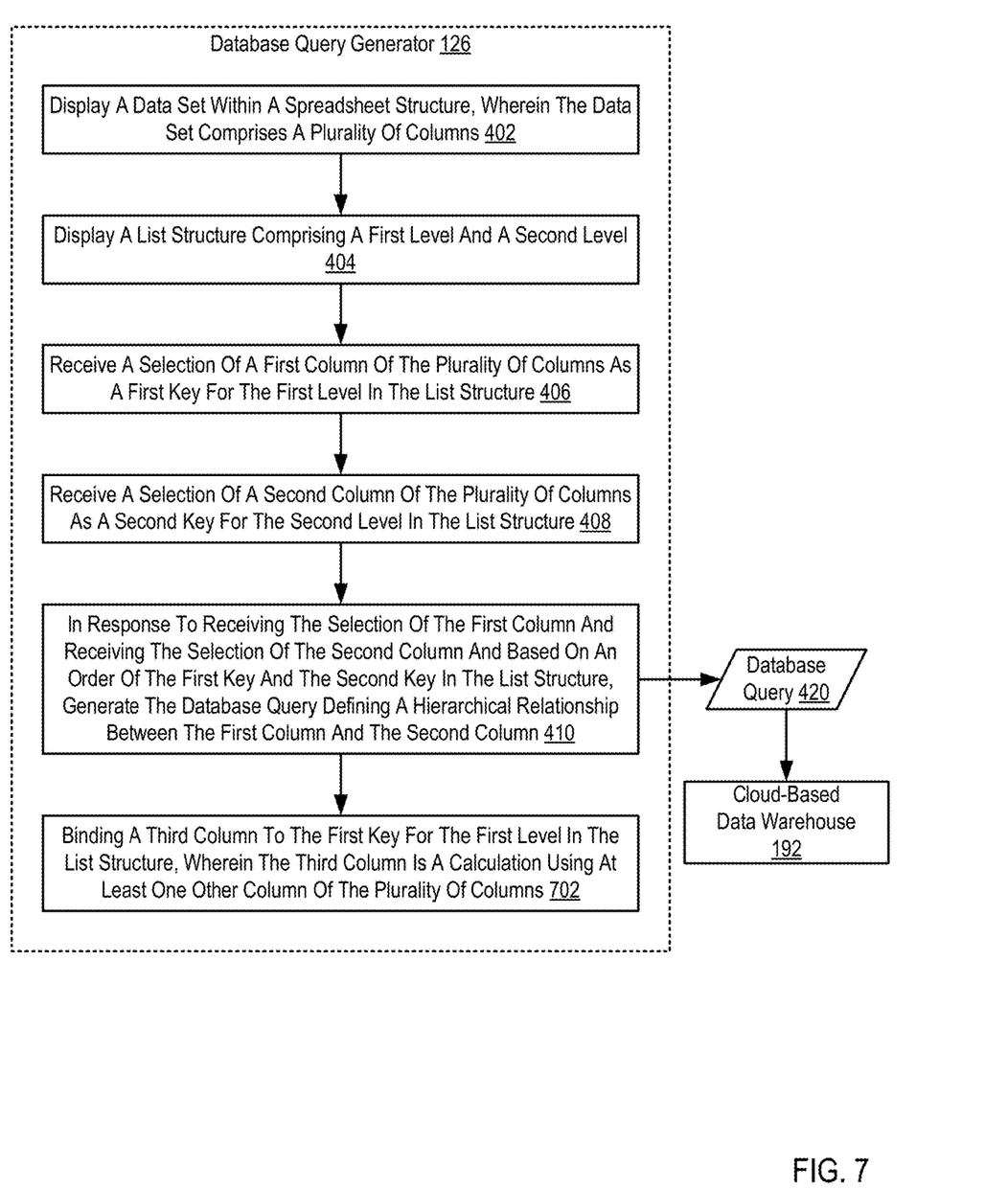
FIG. 7 sets forth a flow chart illustrating an exemplary method for generating a database query using a dimensional hierarchy within a graphical user interface according to embodiments of the present invention.

For further explanation, FIG. 7 sets forth a flow chart illustrating a further exemplary method for generating a database query using a dimensional hierarchy within a graphical user interface according to embodiments of the present invention that includes displaying (402) a data set within a spreadsheet structure, wherein the data set comprises a plurality of columns; displaying (404) a list structure comprising a first level and a second level; receiving (406) a selection of a first column of the plurality of columns as a first key for the first level in the list structure; receiving (408) a selection of a second column of the plurality of columns as a second key for the second level in the list structure; and in response to receiving the selection of the first column and receiving the selection of the second column and based on an order of the first key and the second key in the list structure, generating (410) the database query (420) defining a hierarchical relationship between the first column and the second column.

The method of FIG. 7 differs from the method of FIG. 4, however, in that the method of FIG. 7 further includes binding (702) a third column to the first key for the first level in the list structure, wherein the third column is a calculation using at least one other column of the plurality of columns. Binding (702) a third column to the first key for the first level in the list structure, wherein the third column is a calculation using at least one other column of the plurality of columns may be carried out by the database query generator (126) receiving, from a user, a selection of a third column for binding to the first key. A user may bind a column to a key in a level by dragging and dropping the column in the level and adjacent to the key. Alternatively, a user may bind a column to a key in a level by selecting the column and using a menu to bind the column to a particular key in a particular level.

Binding a calculation column to a key in a level applies the calculation to the entire column group instead of each data row. For example, a third column that calculates the number or rows would show a '1' for each row if the third column were a base column. However, if the third column were bound to the city column of Table 2, the third column would show a '4' for Austin, a '4' for Dallas, and a '4' for Houston.

The third column may be a calculation using a column bound to the second key for the second level in the list structure. A calculation column may use, as input, a different calculation column bound to a key at a different level. Consider the example shown in Table 3. The city column and the street name column are selected as keys in different levels, with the city column at a higher level than the street name column. A total number of rooms column has been bound to the city column that calculates the total number of rooms per city. A street percent of city total is bound to the street name column and uses as input the number of rooms on each street (at the base level) and the total number of rooms (at the city column level) to calculate what percentage of the total number of rooms in the city are located on a given street.

TABLE 3

| City | Total Number of Rooms | Street Name | Street Percent of City Total | Street Number | Hotel Name | Number of Rooms |
|---|---|---|---|---|---|---|
| Austin | 190 | Brazos St. | 40% | 604 | Driskill | 58 |
|  |  |  |  | 605 | Firehouse | 18 |
|  |  | San Jacinto St. | 60% | 700 | Omni | 65 |
|  |  |  |  | 200 | Hampton Inn | 49 |
| Dallas | 214 | Commerce St. | 44% | 1401 | Magnolia | 35 |
|  |  |  |  | 1700 | Hampton Inn | 60 |
|  |  | Main St. | 24% | 1201 | Westin | 51 |
|  |  | Pacific Ave. | 32% | 1600 | Hilton | 68 |
| Houston | 232 | Crawford St. | 31% | 710 | Hampton Inn | 72 |
|  |  | Texas Ave. | 69% | 1520 | Westin | 44 |
|  |  |  |  | 1100 | Magnolia | 54 |
|  |  |  |  | 700 | Lancaster | 62 |

A calculation column may also use, as input, a sum of a group of rows, either in a separate column, in the same column, or both. For example, a calculation column may calculate the cumulative percentage of one column for a given key. As shown in the example of Table 4, the cumulative street percentage calculates the cumulative percentage of the number of hotel rooms at each hotel on each street.

TABLE 4

| City | Total Number of Rooms | Street Name | Cumulative Street Percentage | Street Number | Hotel Name | Number of Rooms |
|---|---|---|---|---|---|---|
| Austin | 190 | Brazos St. | 76% | 604 | Driskill | 58 |
|  |  |  | 100% | 605 | Firehouse | 18 |
|  |  | San Jacinto St. | 57% | 700 | Omni | 65 |
|  |  |  | 100% | 200 | Hampton Inn | 49 |
| Dallas | 214 | Commerce St. | 63% | 1700 | Hampton Inn | 60 |
|  |  |  | 100% | 1401 | Magnolia | 35 |
|  |  | Main St. | 100% | 1201 | Westin | 51 |
|  |  | Pacific Ave. | 100% | 1600 | Hilton | 68 |
| Houston | 232 | Crawford St. | 100% | 710 | Hampton Inn | 72 |
|  |  | Texas Ave. | 28% | 1520 | Westin | 44 |
|  |  |  | 61% | 1100 | Magnolia | 54 |
|  |  |  | 100% | 700 | Lancaster | 62 |

In view of the explanations set forth above, readers will recognize that the benefits of generating a database query using a dimensional hierarchy within a graphical user interface according to embodiments of the present invention include:

Improving the operation of a computing system by generating complex database queries based on user-friendly selections of data categories, increasing computing system usability and functionality.

Improving the operation of a computing system by presenting complex data sets in a spreadsheet structure, increasing computing system usability and functionality.

Exemplary embodiments of the present invention are described largely in the context of a fully functional computer system for generating a database query using a dimensional hierarchy within a graphical user interface. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for generating a database query using a dimensional hierarchy within a graphical user interface, the method comprising:
    displaying a data set within a spreadsheet structure, wherein the data set comprises a plurality of columns;
    displaying a list structure comprising a first level and a second level;
    receiving a selection of a first column of the plurality of columns as a first key for the first level in the list structure;
    receiving a selection of a second column of the plurality of columns as a second key for the second level in the list structure; and
    in response to receiving the selection of the first column and receiving the selection of the second column and based on an order of the first key and the second key in the list structure, generating the database query defining a hierarchical relationship between the first column and the second column.

2. The method of claim 1, further comprising:
receiving a reconfigured data set in response to the database query defining the hierarchical relationship between the first column and the second column, wherein the reconfigured data set is reconfigured based on the hierarchical relationship between the first column and the second column; and
displaying, in the spreadsheet structure, the reconfigured data set.

3. The method of claim 1, further comprising:
receiving a selection of a third column of the plurality of columns as a third key for a third level in the list structure; and
in response to receiving the selection of the third column and based on the order of the first key, the second key, and the third key in the list structure, generating a subsequent database query defining a hierarchical relationship between the first column, the second column, and the third column.

4. The method of claim 1, further comprising:
binding a third column to the first key for the first level in the list structure, wherein the third column is a calculation using at least one other column of the plurality of columns.

5. The method of claim 4, wherein the third column is a calculation using a column bound to the second key for the second level in the list structure.

6. The method of claim 1, wherein the first column selected as the first key for the first level in the list structure comprises a calculation using a least one other column of the plurality of columns.

7. The method of claim 1, wherein the database query defining the hierarchical relationship between the first column and the second column comprises a structure query language group by statement.

8. An apparatus for generating a database query using a dimensional hierarchy within a graphical user interface, the apparatus comprising a computer processor, a computer memory operatively coupled to the computer processor, the computer memory having disposed within it computer program instructions that, when executed by the computer processor, cause the apparatus to carry out the steps of:
displaying a data set within a spreadsheet structure, wherein the data set comprises a plurality of columns;
displaying a list structure comprising a first level and a second level;
receiving a selection of a first column of the plurality of columns as a first key for the first level in the list structure;
receiving a selection of a second column of the plurality of columns as a second key for the second level in the list structure; and
in response to receiving the selection of the first column and receiving the selection of the second column and based on an order of the first key and the second key in the list structure, generating the database query defining a hierarchical relationship between the first column and the second column.

9. The apparatus of claim 8, wherein the computer program instructions further cause the apparatus to carry out the steps of:
receiving a reconfigured data set in response to the database query defining the hierarchical relationship between the first column and the second column, wherein the reconfigured data set is reconfigured based on the hierarchical relationship between the first column and the second column; and
displaying, in the spreadsheet structure, the reconfigured data set.

10. The apparatus of claim 8, wherein the computer program instructions further cause the apparatus to carry out the steps of:
receiving a selection of a third column of the plurality of columns as a third key for a third level in the list structure; and
in response to receiving the selection of the third column and based on the order of the first key, the second key, and the third key in the list structure, generating a subsequent database query defining a hierarchical relationship between the first column, the second column, and the third column.

11. The apparatus of claim 8, wherein the computer program instructions further cause the apparatus to carry out the steps of:
binding a third column to the first key for the first level in the list structure, wherein the third column is a calculation using at least one other column of the plurality of columns.

12. The apparatus of claim 11, wherein the third column is a calculation using a column bound to the second key for the second level in the list structure.

13. The apparatus of claim 8, wherein the first column selected as the first key for the first level in the list structure comprises a calculation using a least one other column of the plurality of columns.

14. The apparatus of claim 8, wherein the database query defining the hierarchical relationship between the first column and the second column comprises a structure query language group by statement.

15. A computer program product for generating a database query using a dimensional hierarchy within a graphical user interface, the computer program product disposed upon a computer readable medium, the computer program product comprising computer program instructions that, when executed, cause a computer to carry out the steps of:
displaying a data set within a spreadsheet structure, wherein the data set comprises a plurality of columns;
displaying a list structure comprising a first level and a second level;
receiving a selection of a first column of the plurality of columns as a first key for the first level in the list structure;
receiving a selection of a second column of the plurality of columns as a second key for the second level in the list structure; and
in response to receiving the selection of the first column and receiving the selection of the second column and based on an order of the first key and the second key in the list structure, generating the database query defining a hierarchical relationship between the first column and the second column.

16. The computer program product of claim 15, wherein the computer program instructions further cause the computer to carry out the steps of:
receiving a reconfigured data set in response to the database query defining the hierarchical relationship between the first column and the second column, wherein the reconfigured data set is reconfigured based on the hierarchical relationship between the first column and the second column; and displaying, in the spreadsheet structure, the reconfigured data set.

17. The computer program product of claim 15, wherein the computer program instructions further cause the computer to carry out the steps of:
- receiving a selection of a third column of the plurality of columns as a third key for a third level in the list structure; and
- in response to receiving the selection of the third column and based on the order of the first key, the second key, and the third key in the list structure, generating a subsequent database query defining a hierarchical relationship between the first column, the second column, and the third column.

18. The computer program product of claim 15, wherein the computer program instructions further cause the computer to carry out the steps of:
- binding a third column to the first key for the first level in the list structure, wherein the third column is a calculation using at least one other column of the plurality of columns.

19. The computer program product of claim 18, wherein the third column is a calculation using a column bound to the second key for the second level in the list structure.

20. The computer program product of claim 15, wherein the first column selected as the first key for the first level in the list structure comprises a calculation using a least one other column of the plurality of columns.

* * * * *